(12) United States Patent
Libin (10) Patent No.: US 10,242,344 B1
(45) Date of Patent: Mar. 26, 2019

(54) ADVANCING JOINT PROJECTS ON WEARABLE DEVICES

(71) Applicant: Evernote Corporation, Redwood City, CA (US)

(72) Inventor: Phil Libin, San Jose, CA (US)

(73) Assignee: EVERNOTE CORPORATION, Redwood City, CA (US)

( * ) Notice: Subject to any disclaimer, the term of this patent is extended or adjusted under 35 U.S.C. 154(b) by 520 days.

(21) Appl. No.: 14/929,521

(22) Filed: Nov. 2, 2015

Related U.S. Application Data (60) Provisional application No. 62/074,026, filed on Nov. 2, 2014.

(51) Int. Cl.

| | | |
|---|---|---|
| *G06Q 10/10* | (2012.01) | |
| *H04M 1/725* | (2006.01) | |
| *H04L 29/06* | (2006.01) | |
| *G06F 3/0484* | (2013.01) | |
| *G06F 3/0488* | (2013.01) | |
| *G06F 3/0482* | (2013.01) | |

(Continued)

(52) U.S. Cl.
CPC ......... *G06Q 10/103* (2013.01); *G06F 3/0482* (2013.01); *G06F 3/04842* (2013.01); *G06F 3/04883* (2013.01); *G06Q 10/1095* (2013.01); *H04L 65/1069* (2013.01); *H04L 65/1079* (2013.01); *H04L 65/1086* (2013.01); *H04L 65/403* (2013.01); *H04M 1/72566* (2013.01); *H04W 4/70* (2018.02); *H04W 4/80* (2018.02)

(58) Field of Classification Search
CPC ......... G06Q 10/00; G06Q 40/00; G06F 17/60

USPC .................................................... 705/7.19
See application file for complete search history.

(56) References Cited

U.S. PATENT DOCUMENTS

| | | | | |
|---|---|---|---|---|
| 5,671,361 A | * | 9/1997 | Brown | G06Q 10/06 705/7.23 |
| 6,675,149 B1 | * | 1/2004 | Ruffin | G06Q 10/06 705/7.12 |

(Continued)

OTHER PUBLICATIONS

ACU National "Project Management Handbook", Apr. 2, 2007, Australian Catholic University, pp. 1-94.*

(Continued)

*Primary Examiner* — Romain Jeanty
(74) *Attorney, Agent, or Firm* — Morgan, Lewis & Bockius LLP (57) ABSTRACT

Managing information for a project includes identifying content items corresponding to the project, identifying project participants that access the content items, sharing at least some of the content items with at least some of the project participants, prioritizing the project participants based, at least in part, on contribution by the project participants to the content items, and displaying, on a wearable device of a master user, the project participants according to priority levels thereof. The wearable device may be a smart watch. The project participants may be displayed in a plurality of groups of the project participants according to prioritizing levels. The prioritizing levels may take into account development milestones, production milestones, contract closures, external demos, customer meetings, and/or project phase completion schedules. The master user may use a gesture to remove at least one of the groups and to expand remaining groups displayed on the wearable device.

14 Claims, 5 Drawing Sheets

(51) Int. Cl.
*H04W 4/70* (2018.01)
*H04W 4/80* (2018.01)

(56) References Cited

U.S. PATENT DOCUMENTS

| | | | | |
|---|---|---|---|---|
| 6,842,760 | B1* | 1/2005 | Dorgan | G06Q 10/06 |
| | | | | 700/100 |
| 7,212,987 | B2* | 5/2007 | Swanke | G06Q 10/06 |
| | | | | 705/7.15 |
| 8,121,881 | B2* | 2/2012 | Fishman | G06Q 10/06 |
| | | | | 705/7.11 |
| 9,406,039 | B2* | 8/2016 | Reed | G06Q 10/063118 |
| 9,953,284 | B2* | 4/2018 | Smith | G06Q 10/06313 |
| 2003/0046345 | A1* | 3/2003 | Wada | G06Q 10/06 |
| | | | | 709/205 |
| 2016/0012374 | A1* | 1/2016 | Roman | G06Q 10/063112 |
| | | | | 705/7.14 |

OTHER PUBLICATIONS

Project Management Handbook, ACU National, Dec. 2007, pp. 1-94 (Year: 2007).*

* cited by examiner

ADVANCING JOINT PROJECTS ON WEARABLE DEVICES

CROSS-REFERENCE TO RELATED APPLICATIONS

This application claims priority to U.S. Prov. App. No. 62/074,026, filed Nov. 2, 2014, and entitled "IDENTIFYING AND PRIORITIZING JOINT PROJECTS AND PARTICIPANTS ON WEARABLE DEVICES," which is incorporated by reference herein.

TECHNICAL FIELD

This application relates to the field of information processing, user interfaces and communications, and more particularly to the field of prioritizing and displaying on a wearable device of lists of project participants grouped by priorities.

BACKGROUND OF THE INVENTION

Collaboration and teamwork play an increasingly important role in workspace productivity. As noted by IDC, "To innovate and remain competitive, organizations need to provide the right tools, culture, and IT ecosystem for employees, business partners, suppliers, and customers to communicate and collaborate in real time and in context."

The nature of enterprise collaboration is constantly changing with the arrival of new content management systems, such as the Evernote Service and software developed by Evernote Corporation of Redwood City, Calif., conferencing software and services brought by Cisco, Adobe, Microsoft, Zoho and other players; progress in enterprise social networks driven by IBM, Jive, Communispace, Telligent, Microsoft Yammer, Atlassian Confluence and other software; cloud, extranet and intranet services, etc. Market research suggests that new types of enterprise collaboration software are growing by 40% annually since 2014 and will continue growing at that pace at least until 2016.

Notwithstanding an overall growth of the enterprise collaboration solution market, different categories of software and services are expected to grow with different speed and some may even decline. Thus, according to some market surveys and reports, demand for unified communications and collaboration (UC&C) products that offer instant messaging, audio calls, online meetings and video conferencing, will start to drop overall in 2014. The reason is that, unlike the enterprise social software, these tools don't necessarily help employees discover peers outside of their work groups with desired expertise. Additionally, numerous studies suggest that free unbounded collaboration, not limited by pre-scheduled meetings and modeled after flexible collaboration patterns of social networks, will gradually become a key driver of workspace efficiency.

Growing workforce mobility is an important amplifier of a flexible and efficient collaboration style. Employees may access their work related information, together with shared group and business wide materials at any time and place, as long as their mobile devices are online and are securely connected to the appropriate information sources. Work flexibility is an important factor of the fast growth of mobile markets, which are expected to reach 10 billion Internet-connected mobile devices by 2016 in worldwide use, including around eight billion smartphones and tablets.

The next wave of mobile computing will see an exponential growth of wearable devices, including smart watches, activity trackers, wearable medical devices, smart glasses, wearable cameras, intelligent and adaptable clothing, etc. Analysts estimate that wrist-worn devices, such as smart watches and wristbands for activity tracking and medical purpose, will dominate the early wearables market. Some forecasts put the market share of wrist-worn wearables at 87% of all wearable shipments by year 2018. Top categories and models of smart watches, such as the Apple Watch, Samsung Galaxy Gear, Pebble and many other models are already shipping in increasing volumes and vendors are constantly improving their features, design and software integration capabilities.

Wearable devices, such as smart watches or smart glasses, are increasingly serving as instant information delivery vehicles; being constantly viewable by owners without any additional efforts and in hands free manner, they exceed even smartphones and tablets in the capacity to provide seamless information access. Therefore, wearable devices may serve as nearly perfect notification tools for hands free access to vital bits of information on various aspects of personal and business life and joint activities of the owner. However, methods and systems for productive use of wearable devices in enterprise collaboration haven't been extensively explored. One challenge facing productive use of such devices is their relatively small screen size, which limits information display capabilities on such devices and requires special methods of organization, grouping, display and manipulation of information, as well as optimal distribution of information between wearable devices and other mobile computing mechanisms, such as smartphones and tablets.

Accordingly, it is desirable to provide a productive use of wearable devices such as smart watches or smart glasses in enterprise collaboration solutions in conjunction with contemporary content management systems.

SUMMARY OF THE INVENTION

According to the system described herein, managing information for a project includes identifying content items corresponding to the project, identifying project participants that access the content items, sharing at least some of the content items with at least some of the project participants, prioritizing the project participants based, at least in part, on contribution by the project participants to the content items, and displaying, on a wearable device of a master user, the project participants according to priority levels thereof. The wearable device may be a smart watch. The project participants may be displayed in a plurality of groups of the project participants according to prioritizing levels. The prioritizing levels may take into account development milestones, production milestones, contract closures, external demos, customer meetings, and/or project phase completion schedules. The master user may use a gesture to remove at least one of the groups and to expand remaining groups displayed on the wearable device. Expanding remaining groups may show additional information about each of the project participants therein. Additional information may be provided to indicate whether each of the project participants shown on the wearable device is available for instant communication. The master user may tap on a particular one of the project participants on the wearable device to initiate an instant communication session therewith. During the instant communication session, detailed information about the particular one of the project participants may be displayed on another device of the master user. During the instant communication session, detailed information about the master user may be displayed on a device of the particular one of the project participants. The additional information may include content items created and modified by the particular one of the project participants. The content items may include embedded text, images, audio clips, video clips, reminders, checklists, and/or documents. The master user may add and remove the project participants. Different ones of the project participants may have different levels of access rights to the content items. Different ones of the project participants may add and remove new project participants. The master user may schedule a communication session with communication participants that are a subset of the project participants. The master user may postpone the communication session until all of the communication participants are available. The master user may receive a reminder when all of the communication participants become available.

According further to the system described herein, a non-transitory computer-readable medium contains software that manages information for a project. The software includes executable code that identifies content items corresponding to the project, executable code that identifies project participants that access the content items, executable code that shares at least some of the content items with at least some of the project participants, executable code that prioritizes the project participants based, at least in part, on contribution by the project participants to the content items, and executable code that displays, on a wearable device of a master user, the project participants according to priority levels thereof. The wearable device may be a smart watch. The project participants may be displayed in a plurality of groups of the project participants according to prioritizing levels. The prioritizing levels may take into account development milestones, production milestones, contract closures, external demos, customer meetings, and/or project phase completion schedules. The master user may use a gesture to remove at least one of the groups and to expand remaining groups displayed on the wearable device. Expanding remaining groups may show additional information about each of the project participants therein. Additional information may be provided to indicate whether each of the project participants shown on the wearable device is available for instant communication. The master user may tap on a particular one of the project participants on the wearable device to initiate an instant communication session therewith. During the instant communication session, detailed information about the particular one of the project participants may be displayed on another device of the master user. During the instant communication session, detailed information about the master user may be displayed on a device of the particular one of the project participants. The additional information may include content items created and modified by the particular one of the project participants. The content items may include embedded text, images, audio clips, video clips, reminders, checklists, and/or documents. The master user may add and remove the project participants. Different ones of the project participants may have different levels of access rights to the content items. Different ones of the project participants may add and remove new project participants. The master user may schedule a communication session with communication participants that are a subset of the project participants. The master user may postpone the communication session until all of the communication participants are available. The master user may receive a reminder when all of the communication participants become available.

The proposed system tracks items in a content collection that is shared by a master user with other participants of joint projects, identifies items that have been edited by other participants of the projects, prioritizes participants by using a set of criteria, displays participants by priority levels on smart watches, smart glasses or other wearable device of the master user, provides the master user with an ability to choose one or several participants on the wearable device and instantly view or join editing of the corresponding content items on another mobile device with enhanced viewing capabilities, such as a smartphone, a tablet or a notebook.

An advantage of introducing a wearable device for viewing general information on project participants into a collaboration process lies in an instant hands free access to the list of participants. Such access may be useful in situations where usage of a smartphone or a larger mobile device by a master user is undesirable—for example, on the go, during a talk or a party, and/or under other conditions in which looking on a smartphone screen may be considered a distraction.

The master user may prefer to start by determining a need to interact with product participants by glancing at a smart watch or other wearable device and by viewing collaboration priorities. Then, the master user may zoom user groups that are schematically depicted on the smart watch face or on an other wearable device, such as smart glasses, until particular users are selected. Choosing a needed participant on the same wearable device allows the master user to dive, if necessary, into details of interaction and information exchange using, for the information exchange, mobile devices with larger screen sizes. Alternatively, the master user may postpone such interaction to a later time but retain a chosen participant. Such a two-tier arrangement with wearable devices and smartphones (or tablets) may add flexibility to collaboration between participants and may improve and speed up decision-making by project leaders.

System functioning can be described as a sequence of steps explained below:

1. A master user is in charge of a personal, jointly authored or business wide content collection (such as a selectively shared or widely accessible Evernote notebook or notebook stack) used to accomplish various group projects by multiple participants. The collection may include multiple items (notes) containing embedded text, images, audio, video, checklists, tasks, calendar items, various types of attachments, such as Microsoft Office®, PDF or multimedia files and other content formats.
2. The master user shares some or all of the items in the content collection with other project participants; sharing may be restricted within a workgroup or other team or may be company-wide sharing or published online with public access. Examples of content include research data, product information, partnership and business plans, engineering, production or operational materials, etc. Some employees may only have viewing permissions for particular shared content; others may have a full or limited editing access to certain items, thus becoming virtual participants of content processing. Other participants may have an even higher level of privileges and may be permitted, under certain conditions, to invite other participants with different levels of credentials.
3. Participants may access shared content items at different times, contribute to the content with different intensity and maintain various communication channels with the master user and between themselves. The system may keep and update a participant map, reflecting contributions of participants to the shared content and schedules of participants related to the contributions to the extent that the schedules are also shared with the master user and/or other participants. For example, one of the participants may schedule a meeting with other participant(s) of a collaborative project to discuss progress of the project; the master user may be interested in having a quick conversation with the participants who have scheduled the meeting to make sure that video or other materials participants are planning to discuss are up to date.

4. Contributions of participants to shared content, other activities, and schedules may result in different priorities of interactions of the participants with the shared content from the standpoint of the master user. Prioritization criteria may include announced or agreed upon work deadlines, such as development or production milestones, contract closures, external demos, customer meetings, project phase completion schedules, etc. Other criteria may reflect urgent or high-impact activities reflected in the shared content. The importance of the activities may be judged, for example, by an amount of related content created by the master user after the original sharing, irrespective of whether such additional content has also been shared or remained private for the master user. Yet another set of prioritization criteria may be related to an overall editing time span by a participant or a contribution volume made by a participant to the shared content. Additional prioritization criteria may be related to location of the master user at the moment when priorities are assessed. For example, arrival of the master user to a production site for reviewing a certain product may prioritize participants who made recent changes to content items related to that product and/or site. Using the above criteria, the system may calculate participant priorities at any time and group active participants of collaborative projects by priorities. The system may store and process information about participants and activities of the participants in a cloud-based service, on mobile devices or desktops of project participants or in a combination of local and cloud-based storage and processing.

5. On demand of the master user, the system may build a current prioritized list of participants and display the on a screen of a wearable device, such as a smart watch face or a smart glasses display, of the master user. There may be many ways of compactly displaying participant groups arranged by priorities, depending on screen real estate and control options of the master user. For example, if a number of participant groups and priority levels is significant, a diagram consisting of a set of concentric circles or arcs, each depicting a priority level and displaying only a size (number of participants) of each group may be initially displayed on the wearable device, where the central circle may be occupied by the participant group with the highest priority and wider circles may correspond to lower priorities. If the master user is capable of controlling the device, say, via multi-touch gestures, mechanical buttons, spatial gestures or other means, the master user may be able to zoom in the initial diagram to access details of a group of participants at a particular priority level, including, for example, avatars or other icons, initials or other identifying marks of the participants.

6. Once the participant group for a desired priority level (or adjacent levels) is displayed on the screen of the wearable device of the master user, the master user may be able to choose one or several participants from the group (or adjacent groups) for reviewing shared content modified by the selected participant(s) or for instant communications with the participant(s).

7. The master user may be able to instantly view shared content items that have been created or modified by the chosen participant(s) or the items to which chosen participants have had access, even if the chosen participants didn't modify the items. Since content viewing directly on the wearable device may not be feasible, choosing participants on a wearable device for further collaboration may initialize a content viewing, editing or communication session on smartphone, tablet, laptop or other device of the master user with a sufficient screen size. The master user may review previous editing activity of the shared content by the participant (s), view an on-going editing session, communicate or share editing activity with the participant(s), etc. Icons of participants in priority groups on the wearable device of the master user may be marked or highlighted to show instant availability of each participant. The master user may choose one or several participants for instant communications, as explained elsewhere herein, or may review content modified by certain participants without direct involvement of the participants. Furthermore, the master user may postpone a content viewing, editing and communication session and may set up system reminders to engage in the content reviewing and/or communication session at a later time (for example, the system may remind about a postponed session at a time when all chosen participants are available for communications).

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for identifying priorities between participants of collaborative projects, displaying groups of participants by priorities on a wearable device of a master user and allowing the user to navigate groups of participants and select one or more participants from the groups for advancing joint projects instantly or at a later time, including editing of shared content stored in content collections managed by the master user and/or instant communications between the master user and other project participants.

Figure 1:
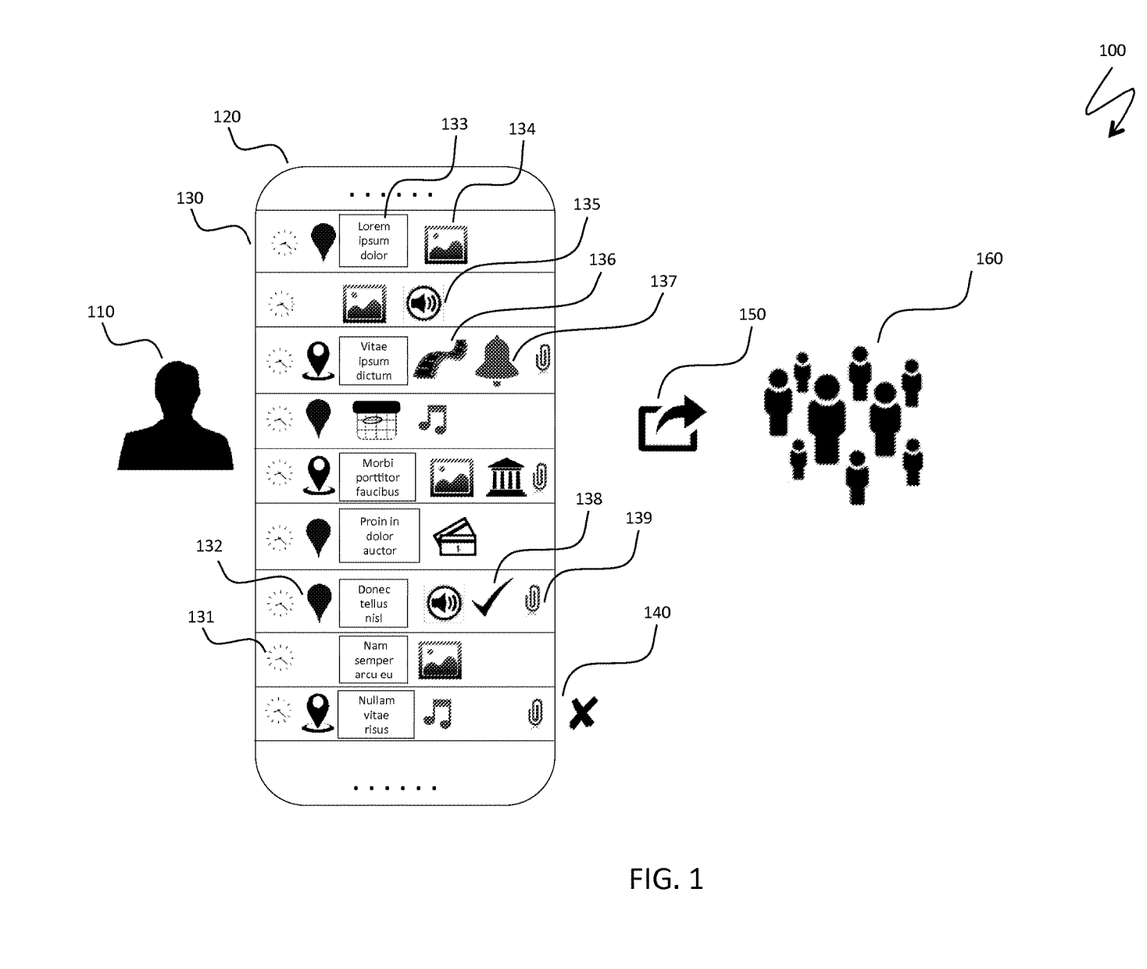
FIG. 1 is a schematic illustration of information sharing from a content management system, according to an embodiment of the system described herein.

FIG. 1 is a schematic illustration 100 of information sharing from a content management system. A master user 110 is in charge of a content collection 120 (such as a single or multiple Evernote notebooks) where multiple content units, or notes 130, may have different types of attributes, for example, date and time attribute 131 and a location attribute 132, and may include various content, including, but not limited to, embedded text 133, images 134, audio clips 135, video clips 136, reminders 137, checklists 138, and attachments 139 in various formats (e.g. PDF, Microsoft Office® files, etc.). Content collections managed by the master user may not be shared in their entirety with other participants: some of the content items 140 may be excluded from sharing with other participants.

The master user 110 may share a portion of the content collection, as illustrated by a sharing icon 150, with participants of joint projects 160, which may include co-workers, company departments, a whole company or any other collaborators. Sharing facilitates conducting collaborative projects, which may include, among other activities, editing, expanding and discussing shared content from the content collection 120. The set of participants may have different access permissions with respect to shared content items; and at the most granular level, each portion 131-139 of any content item 130 may be subject to viewing, editing and sharing restrictions for any particular participant of a joint project. Furthermore, a list of participants may be dynamic: the master user may invite or exclude additional participants to joint projects; select participants with higher levels of permissions may also be able to invite other participants or exclude the participants that were previously invited.

Figure 2:
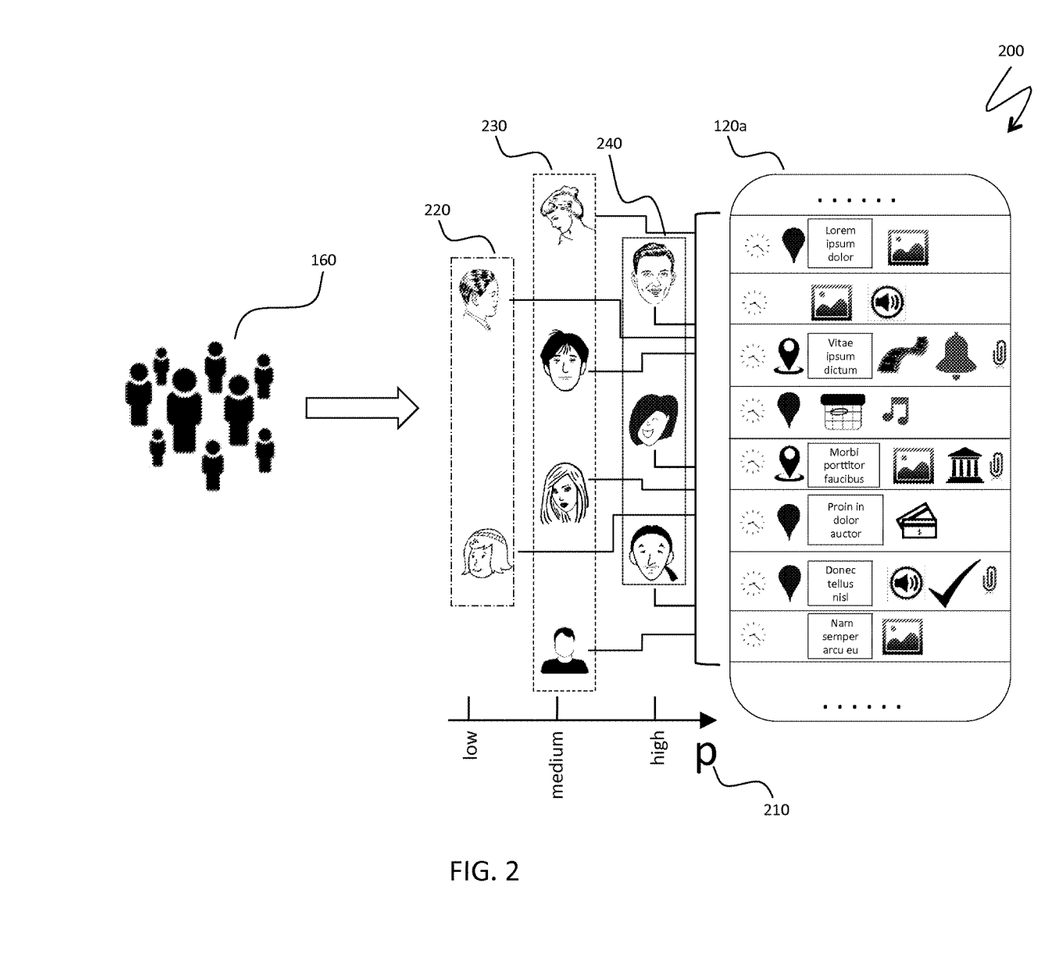
FIG. 2 schematically illustrates grouping participants of joint projects by priorities, according to an embodiment of the system described herein.

FIG. 2 is a schematic illustration 200 of grouping participants of joint projects by priorities. A team of participants 160 may be split into priority groups based on priority criteria, explained elsewhere herein, including dynamics of accessing and editing content in a shared content collection 120a. In the illustration 200, the priority scale 210 includes three levels of priorities: low, medium and high; accordingly, users are subdivided into three groups 220, 230, 240, corresponding to the priority levels.

Figure 3:
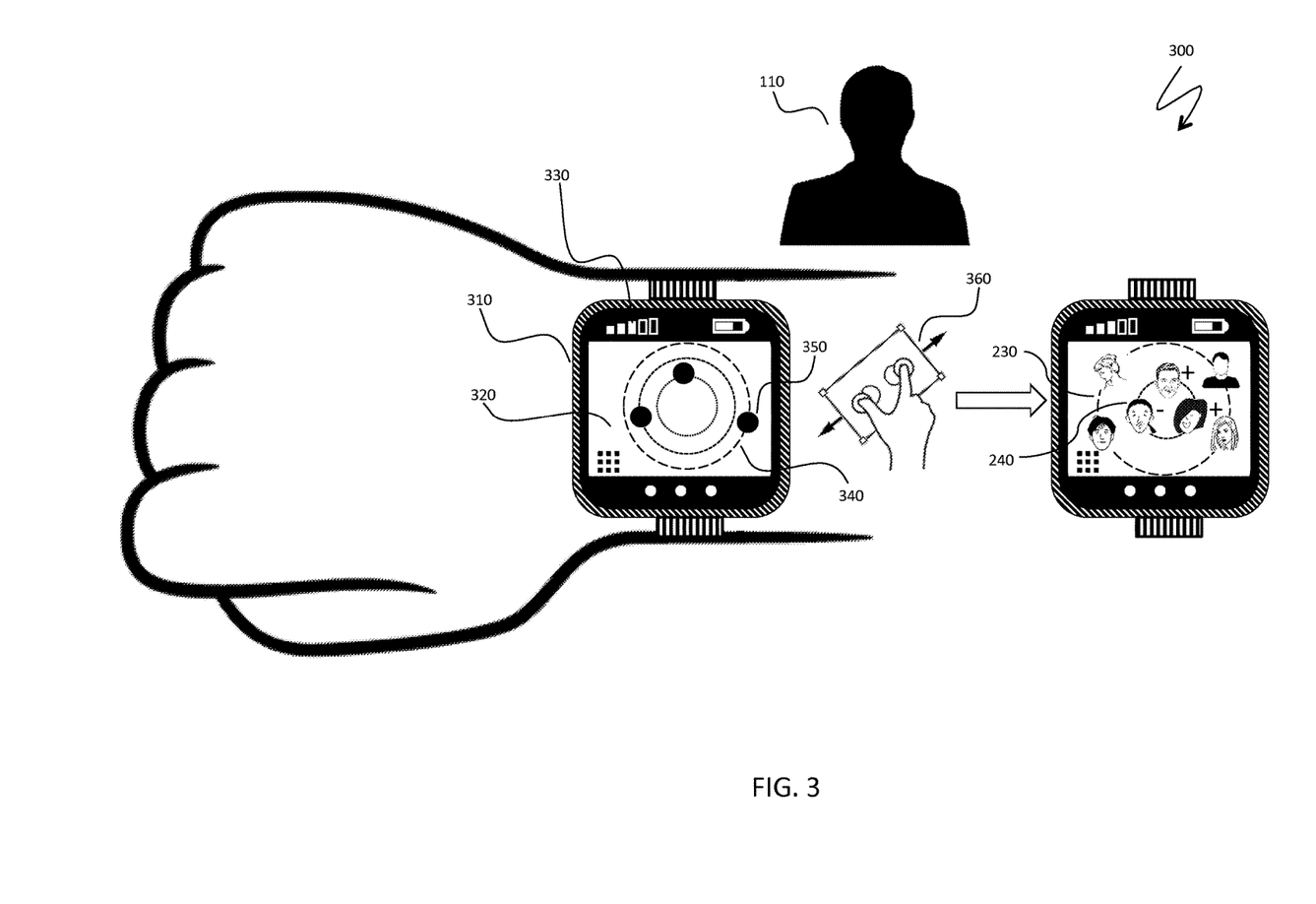
FIG. 3 is a schematic illustration of display and manipulation of groups of participants on smart watches, according to an embodiment of the system described herein.

FIG. 3 is a schematic illustration 300 of display and manipulation of groups of participants on smart watches. A master user 110 wears a smart watch 310 with a touch sensitive screen 320, connected with the Internet to communicate with a cloud-based service supported by the system, as illustrated by an indicator 330. Alternatively, the smart watch 310 may have a local wireless connectivity, such as Bluetooth, to connect with a smartphone or tablet of a user, which provides Internet connectivity back to the wearable device.

FIG. 3 illustrates a situation when the system is running on the smart watch 310 of the master user who has just requested status of groups of participants by priorities. In response, the system has grouped users, identified three groups by priorities, and calculated an available space on the screen of the smart watch 310 based on the model of the smart watch 310 of the master user (registered with the system). The system has determined that it may only depict a compact chart of three user groups; subsequently, the system displays the chart in the form of concentric circles 340, where each circle corresponds to a user group and has an associated number of users 350 displayed for each group/circle.

The master user may decide to proceed with advancing a joint project and choose participants for reviews, discussions and other activities. Subsequently, the master user could make a zoom gesture 360 on the screen of smart watch 310 (or use other control method, as explained elsewhere herein) to zoom in the chart. The result is shown on the right side of FIG. 3, where an outer user group (with low priority) disappears from the screen and the system has determined that the real estate of the screen is sufficient to display detailed information about the participants from the remaining two groups 230, 240 (same groups as in FIG. 2), which are displayed, possibly with an additional information about availability of the participants for instant communications, as selectively illustrated by plus and minus signs next to icons for the participants of the smaller circle, corresponding to the high priority user group 240.

Note that actions performed by the system and the master user in conjunction with FIG. 3 are not necessarily associated only with smart watches 310. Other wearable device, such as, for example, smart glasses, may be used.

Figure 4:
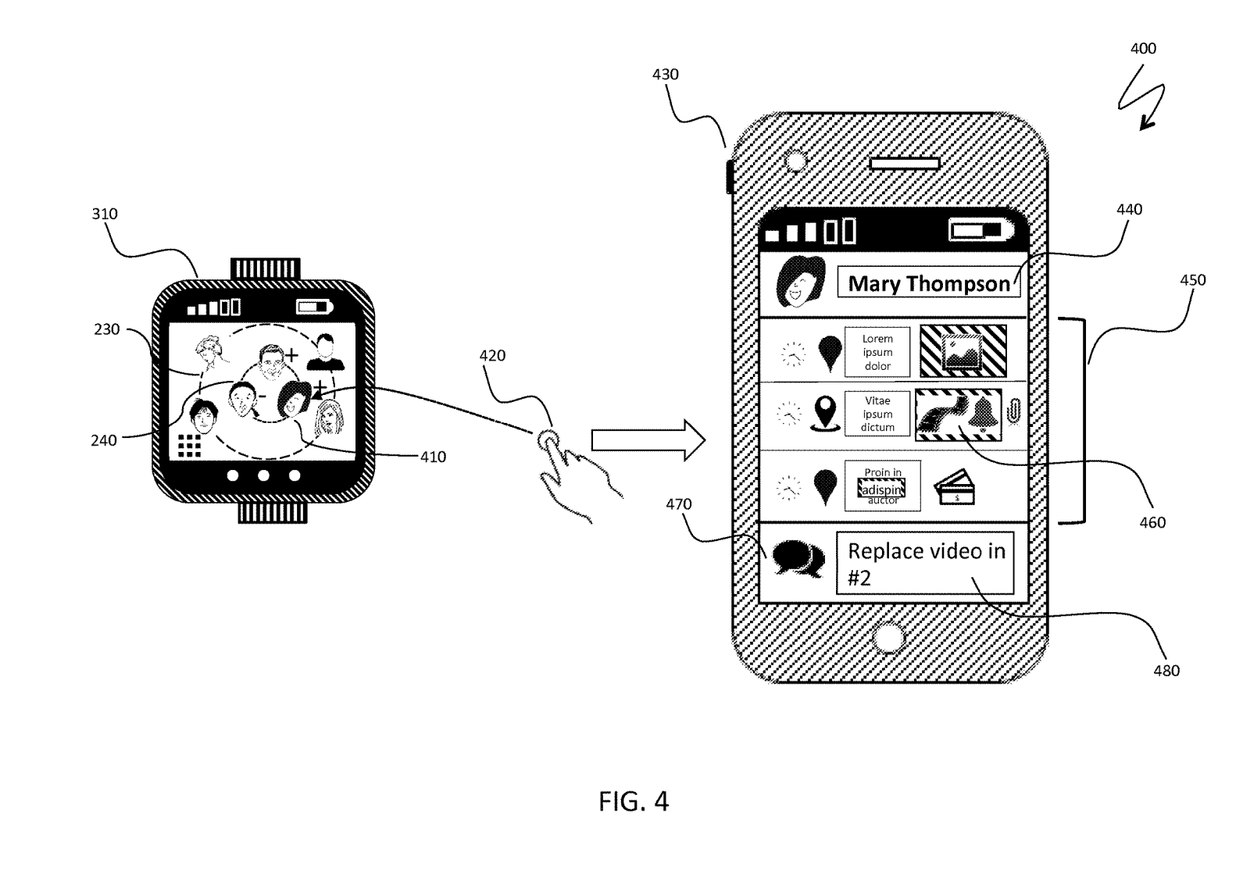
FIG. 4 is a schematic illustration of choosing a participant on a wearable device and interacting with the participant on a mobile device, according to an embodiment of the system described herein.

FIG. 4 is a schematic illustration 400 of choosing a participant on a wearable device and interacting with the participant on a mobile device. The master user wears the smart watch 310 and reviews detailed information on the priority groups 230, 240. The master user chooses a participant 410 (who is available for instant communications, as illustrated by the plus sign near the icon of the participant 410) using a tap gesture 420 on the icon of the participant 410. Choosing the participant 410 initiates an instant collaboration session conducted between a smartphone 430 of the master user and a mobile device of the participant 410. A top portion of the screen of the smartphone 430 includes information 440 about the participant 410, followed by content 450, portions 460 of which, shown with a diagonal background pattern, have been recently edited by the participant 410 and may become a subject of discussions and communications between the master user and the participant 410.

A bottom portion of the screen of the smartphone 430 includes a mobile messaging window 470 where the master user has entered a message 480 requesting the participant 410 to further modify the portion 430 of the recently edited content 450—specifically, to replace a video clip in a second note (content item).

Figure 5:
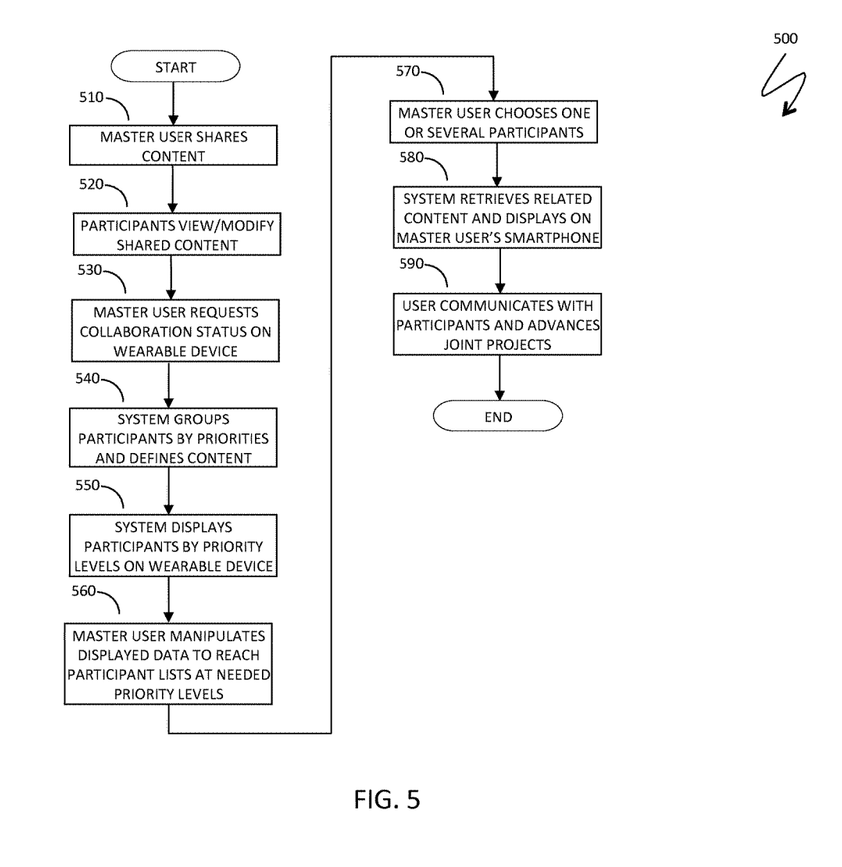
FIG. 5 is a system flow diagram illustrating system functioning, according to an embodiment of the system described herein.

Referring to FIG. 5, a flow diagram 500 illustrates processing performed in connection with functioning of the system described herein. Processing starts at a step 510, where a master user shares content with participants of joint projects, as explained elsewhere herein. After the step 510, processing proceeds to a step 520, where the participants interact with the shared content, viewing and potentially modifying the content. After the step 520, processing proceeds to a step 530, where the master user requests collaboration status from a wearable device of the master user. After the step 530, processing proceeds to a step 540, where the system computes participant priorities, builds participant groups by priorities, and defines relevant portions of content viewed and modified by each participant, as explained elsewhere herein. After the step 540, processing proceeds to a step 550, where the system displays participants by priority levels on the wearable device of the master user, as explained elsewhere herein (see in particular FIG. 3 and the accompanying text). After the step 550, processing proceeds to a step 560, where the user manipulates displayed data (such as the compact circular chart 340 in FIG. 3) to reach participant lists at priority levels of interest. After the step 560, processing proceeds to a step 570, where the master user chooses one or several participants (as illustrated, in particular, in FIG. 4 and the accompanying text). After the step 570, processing proceeds to a step 580, where the system retrieves relevant content applicable to chosen users and displays the relevant content on the smartphone or other mobile devices with a larger screen size of the master user. After the step 580, processing proceeds to a step 590, where the user communicates with chosen participants and advances joint projects. After the step 590, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The system described herein may be implemented with various types of wearable devices existing today or coming to market in the future. Certain components of the system may operate within a cloud-based service, although operation of the components on local networks or directly on user controlled devices such as smartphones is also possible.

Note that wearable device(s) and smartphones enabling the system described herein may include software that is pre-loaded with the device, installed from an application store, installed from media such as a CD, DVD, etc., and/or downloaded from a Web site. The mobile device may use an operating system such as iOS, Android OS, Windows Phone OS, Blackberry OS and mobile versions of Linux OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of displaying prioritized information for a project, the method comprising:
    at a device including one or more processors and memory storing one or more programs including instructions for execution by the one or more processors:
        identifying content items corresponding to the project;
        identifying project participants that access the content items;
        determining, using prioritization criteria, a first priority level that corresponds to a first group that includes a first set of the project participants and a second priority level that corresponds to a second group that includes a second set of the project participants, wherein the first group and the second group are respective groups of a plurality of groups of the project participants;
    receiving an indication of a first input detected at a user input device, wherein the first input corresponds to a status request;
    in response to receiving the indication of the first input, displaying, by a display device, a plurality of respective representations that correspond to at least a subset of the plurality of groups of the project participants, wherein:
        the plurality of respective representations includes a first representation that corresponds to the first group and a second representation that corresponds to the second group;
        a displayed position of the first representation corresponds to the determined first priority level that corresponds to the first group; and
        a displayed position of the second representation corresponds to the determined second priority level that corresponds to the second group;
    receiving an indication of a second input that corresponds to a zoom request; and
    in response to receiving the indication of the second input:
        ceasing to display a respective representation of at least one group of the plurality of groups that does not meet priority level criteria; and
        displaying additional information that corresponds to at least one remaining group of the plurality of groups that meet the priority level criteria.

2. A method, according to claim 1, wherein the display device is a display of a wearable device.

3. A method, according to claim 1, wherein the prioritization criteria are determined using at least one of: development milestones, production milestones, contract closures, external demos, customer meetings, and project phase completion schedules.

4. A method, according to claim 1, wherein the additional information that corresponds to the at least one remaining group includes information indicating whether at least one of the project participants of the at least one remaining group is available for instant communication.

5. A method, according to claim 4, including:
    receiving an indication of a third input detected at the user input device, wherein the third input corresponds to a communication request for communicating with a respective project participant of the at least one remaining group; and
    in response to receiving the indication of the third input, initiating a communication session with the respective project participant.

6. A method, according to claim 5, including, during the communication session, displaying, by the display device, additional information that corresponds to the respective project participant.

7. A method, according to claim 6, wherein the additional information that corresponds to the respective project participant includes information that corresponds to at least one content item accessed by the respective project participant.

8. A method, according to claim 1, wherein the content items include at least one of: text, images, audio clips, video clips, reminders, checklists, and documents.

9. A method, according to claim 1, including:
    receiving an indication of a fourth input detected at the user input device, wherein the fourth input corresponds to a request for adding a new project participant to at least one group of the plurality of groups of the project participants; and in response to receiving the indication of the fourth input, adding the new project participant to the at least one group.

10. A method, according to claim 1, wherein, for a respective content item of the content items corresponding to the project, an access right is defined for at least one project participant.

11. A method, according to claim 1, wherein the additional information that corresponds to the at least one remaining group includes identifying information for at least one of the project participants of the at least one remaining group.

12. A method, according to claim 1, wherein, prior to receiving the indication of the second input, the displayed first representation includes a displayed number that corresponds to the number of project participants in the first group and the displayed second representation includes a displayed number that corresponds to the number of project participants in the second group.

13. A non-transitory computer-readable storage medium storing one or more programs for execution by one or more processors of a device, the one or more programs including instructions for:

identifying content items corresponding to the project;
identifying project participants that access the content items;
determining, using prioritization criteria, a first priority level that corresponds to a first group that includes a first set of the project participants and a second priority level that corresponds to a second group that includes a second set of the project participants, wherein the first group and the second group are respective groups of a plurality of groups of the project participants;
receiving an indication of a first input detected at a user input device, wherein the first input corresponds to a status request;
in response to receiving the indication of the first input, displaying, by a display device, a plurality of respective representations that correspond to at least a subset of the plurality of groups of the project participants, wherein:
the plurality of respective representations includes a first representation that corresponds to the first group and a second representation that corresponds to the second group;
a displayed position of the first representation corresponds to the determined first priority level that corresponds to the first group; and
a displayed position of the second representation corresponds to the determined second priority level that corresponds to the second group;
receiving an indication of a second input that corresponds to a zoom request; and
in response to receiving the indication of the second input:
ceasing to display a respective representation of at least one group of the plurality of groups that does not meet priority level criteria; and
displaying additional information that corresponds to at least one remaining group of the plurality of groups that meet the priority level criteria.

14. A device including:
one or more processors; and
memory storing one or more programs configured to be executed by the one or more processors, the one or more programs including instructions for:
identifying content items corresponding to the project;
identifying project participants that access the content items;
determining, using prioritization criteria, a first priority level that corresponds to a first group that includes a first set of the project participants and a second priority level that corresponds to a second group that includes a second set of the project participants, wherein the first group and the second group are respective groups of a plurality of groups of the project participants;
receiving an indication of a first input detected at a user input device, wherein the first input corresponds to a status request;
in response to receiving the indication of the first input, displaying, by a display device, a plurality of respective representations that correspond to at least a subset of the plurality of groups of the project participants, wherein:
the plurality of respective representations includes a first representation that corresponds to the first group and a second representation that corresponds to the second group;
a displayed position of the first representation corresponds to the determined first priority level that corresponds to the first group; and
a displayed position of the second representation corresponds to the determined second priority level that corresponds to the second group;
receiving an indication of a second input that corresponds to a zoom request; and
in response to receiving the indication of the second input:
ceasing to display a respective representation of at least one group of the plurality of groups that does not meet priority level criteria; and
displaying additional information that corresponds to at least one remaining group of the plurality of groups that meet the priority level criteria.

* * * * *

UNITED STATES PATENT AND TRADEMARK OFFICE
CERTIFICATE OF CORRECTION

PATENT NO. : 10,242,344 B1
APPLICATION NO. : 14/929521
DATED : March 26, 2019
INVENTOR(S) : Libin It is certified that error appears in the above-identified patent and that said Letters Patent is hereby corrected as shown below:

In the Claims

Claim 13, Column 11, Line 26, please delete "to the project" and insert --to a project--;

Claim 14, Column 12, Line 15, please delete "to the project" and insert --to a project--.

Signed and Sealed this
Thirteenth Day of August, 2019

Andrei Iancu
*Director of the United States Patent and Trademark Office*